US012610448B2

(12) United States Patent
Knight et al.

(10) Patent No.: US 12,610,448 B2
(45) Date of Patent: Apr. 21, 2026

(54) PLASMA TORCH DEVICE COMPONENT MONITORING

(71) Applicant: Edwards Limited, Burgess Hill (GB)

(72) Inventors: Gary Peter Knight, Clevedon (GB); Erik Wagenaars, York (GB); Neil Condon, Burgess Hill (GB); Simone Magni, Clevedon (GB)

(73) Assignee: Edwards Limited, West Sussex (GB)

( * ) Notice: Subject to any disclaimer, the term of this patent is extended or adjusted under 35 U.S.C. 154(b) by 151 days.

(21) Appl. No.: 18/553,046

(22) PCT Filed: Mar. 23, 2022

(86) PCT No.: PCT/GB2022/050733
§ 371 (c)(1),
(2) Date: Sep. 28, 2023

(87) PCT Pub. No.: WO2022/208054
PCT Pub. Date: Oct. 6, 2022

(65) Prior Publication Data
US 2024/0381519 A1     Nov. 14, 2024

(30) Foreign Application Priority Data

Apr. 1, 2021     (GB) ...................................... 2104740

(51) Int. Cl.
*H05H 1/36*          (2006.01)
*G01N 21/73*         (2006.01)
(52) U.S. Cl.
CPC ............... *H05H 1/36* (2013.01); *G01N 21/73* (2013.01)
(58) Field of Classification Search
CPC .... G01N 21/73; H05H 1/0018; H05H 1/0025; H05H 1/0037; H05H 1/01; H05H 1/30; H05H 1/32; H05H 1/36
(Continued)

(56) References Cited

U.S. PATENT DOCUMENTS 4,640,627 A       2/1987   Tracy et al.
2006/0171848 A1   8/2006   Roche et al.
(Continued)

FOREIGN PATENT DOCUMENTS

DE        19756445 A1    2/1999
GB         2441582 A     3/2006
(Continued)

OTHER PUBLICATIONS

British Search Report dated Dec. 15, 2021 for corresponding British Application No. GB2104740.2, 2 pages.
(Continued)

*Primary Examiner* — Sunghee Y Gray
(74) *Attorney, Agent, or Firm* — Theodore M. Magee; Westman, Champlin & Koehler, P.A.

(57) ABSTRACT

Aspects and embodiments relate to plasma torch device component monitoring, a plasma torch device component monitoring system and a plasma torch device including such a monitoring system or suitable for use with such a system. The monitoring method comprises: collecting electromagnetic radiation generated by a plasma torch in a plasma torch device; analysing the collected electromagnetic radiation generated by the plasma torch; comparing the analysed electromagnetic radiation generated to known electromagnetic radiation associated with one or more components of the plasma torch device; and triggering one or more actions in the event that the analysed emission differs from the known emission. Such a monitoring method can allow for ameliorative action to be taken in the event that degradation of one or more components forming the device is detected.

9 Claims, 5 Drawing Sheets

(58) Field of Classification Search
USPC ........................................................ 356/316
See application file for complete search history.

(56) References Cited

U.S. PATENT DOCUMENTS

| | | | |
|---|---|---|---|
| 2007/0221634 | A1 | 9/2007 | Condick |
| 2007/0235432 | A1 | 10/2007 | Schneider |
| 2013/0026918 | A1 | 1/2013 | Rutberg et al. |

FOREIGN PATENT DOCUMENTS

| | | | | |
|---|---|---|---|---|
| GB | 2511840 | A | | 9/2014 |
| JP | 2016170897 | A | | 9/2016 |
| RU | 2006119726 | A | * | 12/2007 |
| WO | 0031773 | A1 | | 6/2000 |
| WO | 2006013355 | A1 | | 2/2006 |
| WO | 2009055750 | A1 | | 4/2009 |
| WO | 2018017046 | A1 | | 1/2018 |
| WO | 2022208082 | A1 | | 10/2022 |

OTHER PUBLICATIONS

PCT Notification of Transmittal of the International Search Report and the Written Opinion of the International Searching Authority, or the Declaration and PCT Search Report dated May 25, 2022 for corresponding PCT application Serial No. PCT/GB2022/050733, 13 pages.
British Search Report dated Jan. 15, 2022 for corresponding British Application No. GB2104741.0, 2 pages.
PCT Notification of Transmittal of the International Search Report and the Written Opinion of the International Searching Authority, or the Declaration and PCT Search Report dated Jun. 2, 2022 for corresponding PCT application Serial No. PCT/GB2022/050798, 14 pages.
Gruber et al., Diagnostics of Cathode Material Loss in Cutting Plasma Torch, Journal of Physics D Applied Physics, vol. 47, No. 29, pp. 1-10, 2014.

* cited by examiner

A

B

PLASMA TORCH DEVICE COMPONENT MONITORING

CROSS-REFERENCE OF RELATED APPLICATION

This application is a Section 371 National Stage Application of International Application No. PCT/GB2022/050733, filed Mar. 23, 2022, and published as WO 2022/208054A1 on Oct. 6, 2022, the content of which is hereby incorporated by reference in its entirety and which claims priority of British Application No. 2104740.2, filed Apr. 1, 2021.

FIELD

The field of the invention relates to plasma torch device component monitoring, and in particular, to predictive maintenance of one or more plasma torch device components.

BACKGROUND

In some manufacturing industries, for example, the semiconductor or flat panel display manufacturing industry, effluent gas streams may be produced by a manufacturing process tool. Residual fluorinated or perfluorinated compounds (PFCs) and other compounds exist in the effluent gas stream pumped from the process tool. These compounds are difficult to remove from the effluent gas stream and their release into the environment is undesirable because they are known to have relatively high greenhouse activity.

One approach to remove the PFCs and other compounds from the effluent gas stream is to use a radiant burner as described, for example, in EP1773474. However, when fuel gases normally used for abatement by combustion are undesirable or not readily available, it is also known to use a plasma torch abatement device.

Plasmas for abatement devices can be formed in a variety of ways. The plasma generated by a plasma abatement device is used to destroy or abate unwanted compounds within the effluent gas stream. Plasma torch abatement devices can be particularly useful in environments subject to flammability constraints, can be cost effective and may offer advantages in terms of installation when compared to radiant burner devices.

Typically an effluent gas stream originates from a manufacturing tool and the abatement process is interlocked with operation of the manufacturing tool. It is helpful to users of manufacturing tools which utilise abatement devices to be able to provide predictable uptime. All abatement devices require maintenance to maintain efficient operation. Accordingly, it is desired to provide an improved technique for monitoring the health of one or more components of a plasma abatement device, for example, such that maintenance of the abatement device can be scheduled to fit with manufacturing tool operation and/or maintenance can be performed when it is required.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides a method comprising: collecting electromagnetic radiation generated by a plasma torch in a plasma torch device; analysing the collected electromagnetic radiation generated by the plasma torch; comparing the analysed electromagnetic radiation generated to known electromagnetic radiation associated with one or more components of the plasma torch device; and triggering one or more actions in the event that the analysed emission differs from the known emission.

Aspects recognise that health and/or operating state of one or more components of a plasma abatement device can be monitored by observation of optical emissions from atomic species generated by decomposition of the component material. Such emissions can be observed, for example, by using an Optical Emission Spectrometer (OES). An increase in specific species emissions can be indicative of indicative of excess wear of, for example, the anode material. An increase in specific species emissions can be indicative of detection of an embedded sacrificial layer included in material forming an abatement reaction chamber or forming a plasma torch nozzle. Detection of those specific species emissions or a change in expected specific species emissions can permit instigation of a warning or signal indicative that action may be required, timely prediction of maintenance of the plasma torch device and/or remedial action, for example, torch power reduction, to prolong component life, and/or shift maintenance or downtime to allow ongoing use of a manufacturing tool which the plasma device supports.

In some arrangements, the collected electromagnetic radiation generated by the plasma torch comprises: emission from volatilised material associated with failure of one or more components of the plasma torch device.

In some arrangements, the plasma torch device comprises: a plasma torch abatement device.

In some arrangements, the electromagnetic radiation comprises: optical emission.

In some arrangements, the analysed electromagnetic radiation comprises: optical emission spectra obtained from the collected electromagnetic radiation generated by the plasma torch.

In some arrangements, the known electromagnetic radiation associated with one or more components of the plasma torch device comprises: a characteristic intensity of the electromagnetic radiation.

In some arrangements, the one or more actions is triggered in the event that the analysed emission intensity passes a threshold difference from the known characteristic intensity.

In some arrangements, the one or more actions is triggered in the event that the analysed emission intensity is compared across two or more collections of electromagnetic radiation separated in time and is determined to be changing from the known characteristic intensity at a predetermined rate.

In some arrangements, the known electromagnetic radiation associated with one or more components of the plasma torch device comprises: a characteristic wavelength or range of wavelengths of the electromagnetic radiation.

In some arrangements, the known electromagnetic radiation associated with one or more components of the plasma torch device comprises: a characteristic frequency or range of frequencies of the electromagnetic radiation.

In some arrangements, the known electromagnetic radiation associated with one or more components of the plasma torch device comprises: emission characteristic of a material forming at least part of the one or more components.

In some arrangements, the known electromagnetic radiation associated with one or more components of the plasma torch device comprises: emission characteristic of a sacrificial element forming part of the one or more components.

In some arrangements, the one or more actions is triggered in the event that the analysed emission is determined to differ from the known emission when it includes the emission characteristic of a sacrificial element forming part of the one or more components.

In some arrangements, the one or more components of the plasma torch device comprises: an anode.

In some arrangements, the one or more components of the plasma torch device comprises: an abatement reaction chamber.

In some arrangements, the one or more components of the plasma torch device comprises: a plasma torch mixing cone.

In some arrangements, the one or more components of the plasma torch device comprises: a seal configured to prevent ingress of contaminants into the abatement reaction chamber.

In some arrangements, the collected electromagnetic radiation generated by the plasma torch comprises: emission from volatilised water associated with failure of a seal of the plasma torch device.

In some arrangements, the one or more actions comprise: a remedial action to extend operation time of the plasma torch device.

In some arrangements, the one or more actions comprise: a maintenance action to extend life of the one or more components of the plasma torch device.

In some arrangements, the one or more actions comprise: raising one or more alerts indicative that one or more components of the plasma torch device require attention.

In some arrangements, the one or more actions comprise: a change in plasma current applied between a plasma torch device anode and a cathode.

In some arrangements, the one or more actions comprise: adjustment of a flow of plasma forming gas through the plasma torch device.

In some arrangements, the plasma torch device comprises an inductively coupled plasma (ICP) torch device and the one or more actions comprise: adjustment of forward power to a coil of the inductively coupled plasma (ICP) torch device.

In some arrangements, the one or more actions comprise: a warning signal indicative that a maintenance action is required in relation to the plasma torch device or component of the plasma torch device.

A second aspect comprises: a system comprising: an electromagnetic radiation detector configured to collect electromagnetic radiation generated by a plasma torch in a plasma torch device; an electromagnetic radiation analyser configured to analyse the collected electromagnetic radiation generated by the plasma torch; a control unit configured to compare the analysed emission generated to known emission associated with one or more components of the plasma torch system; and to trigger one or more actions in the event that the analysed emission is differs from the known emission.

In some arrangements, the electromagnetic radiation analyser comprises: an optical emission spectrometer.

In some arrangements, the collected electromagnetic radiation generated by the plasma torch comprises: emission from volatilised material associated with one or more components of the plasma torch device.

In some arrangements, the collected electromagnetic radiation generated by the plasma torch comprises: emission from volatilised material associated with a substance associated with failure of one or more components of the plasma torch device.

In some arrangements, the plasma torch device comprises: a plasma torch abatement device.

In some arrangements, the electromagnetic radiation comprises: optical emission.

In some arrangements, the analysed electromagnetic radiation comprises: optical emission spectra obtained from the collected electromagnetic radiation generated by the plasma torch.

In some arrangements, the known electromagnetic radiation associated with one or more components of the plasma torch device comprises: a characteristic intensity.

In some arrangements, the one or more actions is triggered in the event that the analysed emission intensity passes a threshold difference from the known characteristic intensity.

In some arrangements, the one or more actions is triggered in the event that the analysed emission intensity is compared across two or more collections of electromagnetic radiation separated in time and is determined to be changing from the known characteristic intensity at a predetermined rate.

In some arrangements, the known electromagnetic radiation associated with one or more components of the plasma torch device comprises: emission characteristic of a material forming at least part of the one or more components.

In some arrangements, the known electromagnetic radiation associated with one or more components of the plasma torch device comprises: emission characteristic of a sacrificial element forming part of the one or more components.

In some arrangements, the one or more actions is triggered in the event that the analysed emission is determined to differ from the known emission when it includes the emission characteristic of a sacrificial element forming part of the one or more components.

In some arrangements, the one or more components of the plasma torch device comprises: an anode.

In some arrangements, the one or more components of the plasma torch device comprises: an abatement reaction chamber.

In some arrangements, the one or more components of the plasma torch device comprises: a plasma torch mixing cone.

In some arrangements, the one or more components of the plasma torch device comprises: a seal configured to prevent ingress of contaminants into the abatement reaction chamber.

In some arrangements, the seal prevents ingress of cooling water into an effluent gas stream and plasma stream.

In some arrangements, the collected electromagnetic radiation generated by the plasma torch comprises: emission from volatilised water associated with failure of a seal of the plasma torch device.

In some arrangements, the one or more actions comprise: a remedial action to extend operation time of the plasma torch device.

In some arrangements, the one or more actions comprise: a maintenance action to extend life of the one or more components of the plasma torch device.

In some arrangements, the one or more actions comprise: raising one or more alerts indicative that one or more components of the plasma torch device require attention.

In some arrangements, the one or more actions comprise: a change in plasma current applied between a plasma torch device anode and a cathode.

In some arrangements, the one or more actions comprise: adjustment of a flow of plasma forming gas through the plasma torch device.

In some arrangements, the plasma torch device comprises an inductively coupled plasma (ICP) torch device and the one or more actions comprise: adjustment of forward power to a coil of the inductively coupled plasma (ICP) torch device.

In some arrangements, the one or more actions comprise: a warning signal indicative that a maintenance action is required in relation to the plasma torch device or component of the plasma torch device.

A third aspect provides a plasma torch device including a system according to the second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

Figure 1:
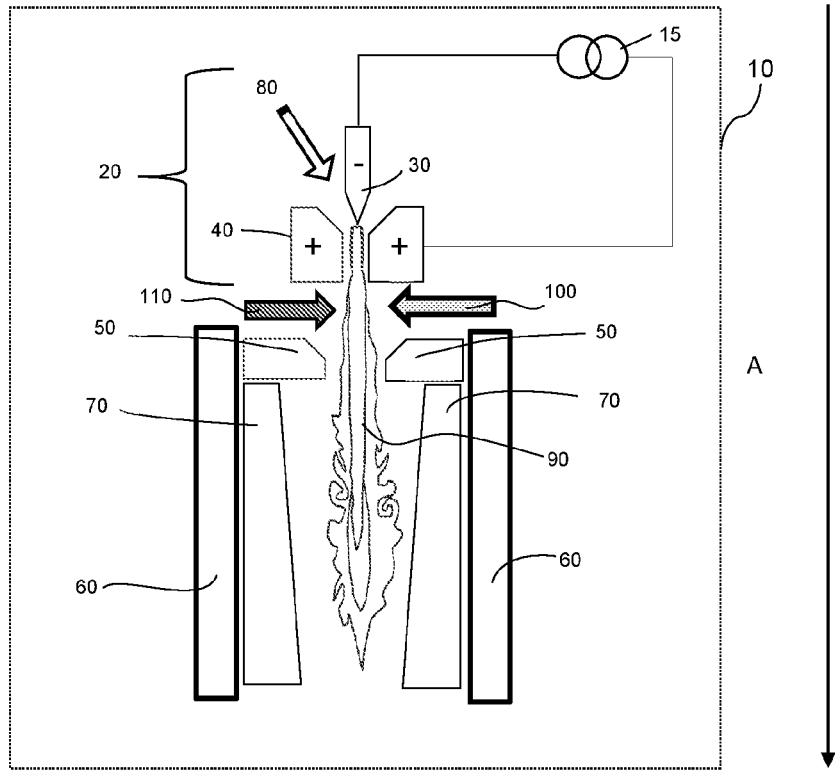
FIG. 1 illustrates main components of a plasma abatement apparatus.

FIG. 1 illustrates a plasma abatement apparatus, generally 10, according to one embodiment. The plasma abatement apparatus has a plasma torch 20 comprising a cathode 30 and an anode 40. The anode 40 comprises an annular structure which defines a tubular void, with the cathode 30 being coaxially aligned with an elongate axis of that tubular void.

A nozzle, also known as a mixing cone, 50 is coaxially aligned with the plasma torch 20, located further along the elongate axis, away from the anode 40. The mixing cone 50 also comprises an annular structure defining a tubular conduit extending along the elongate axis.

The mixing cone 50 is received within a concentrically-surrounding casing 60 which defines a reaction chamber 70.

In operation, a plasma-forming gas stream 80 is introduced between the cathode 30 and the anode 40 which are electrically charged and undergo a DC arc discharge to generate a plasma stream 90 which flows in a direction of flow A which is aligned with the elongate axis. The plasma stream 90 flows through the tubular conduit of the anode 40 and exits towards the mixing cone 50. An effluent gas stream 100, typically together with a fluid reagent stream, for example, compressed dried air, 110, enters the tubular conduit of the mixing cone 50. The combined plasma stream 90, effluent gas stream 100 and fluid reagent 110 travel through the mixing cone 50 towards the reaction chamber 70 and enter the reaction chamber 70 where abatement of compounds within the effluent gas stream 100 occurs.

Figure 4:
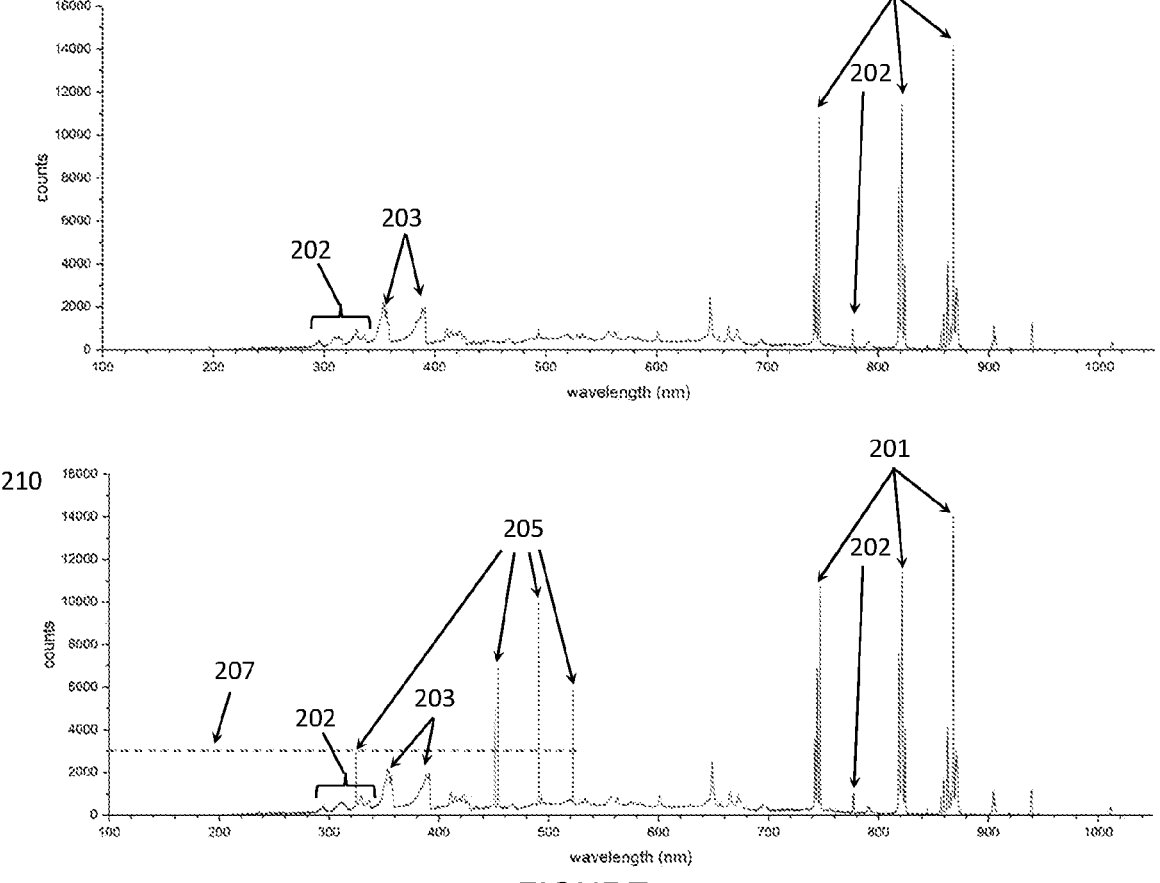
FIG. 4 illustrates example spectra and change in such spectra if component erosion is detected.

Arrangements recognise that plasma generating methods, including DC arc and Inductively Coupled Plasma (ICP) can be used to volatilise material samples and that optical emission spectroscopy can be used to determine composition of such material samples. The ability of the plasma to generate excited species which emit characteristic spectra can be utilised to implement a method by which the condition or health of one or more operating component of a plasma abatement system can be monitored. FIG. 4 illustrates the principles of spectral monitoring which underlie operation of all possible arrangements.

Example components which can be monitored in a plasma abatement system include, for example, an anode in a DC Plasma system. If an anode, typically made from copper or tungsten or an alloy of the two, starts to be eroded, for example, by chemical attack or by operation of the plasma itself as a result of excessively localised arc attachment, material is discharged into the plasma stream. That discharged material can be excited by the plasma such that it emits characteristic emission spectra relating to the construction material.

Arrangements recognise that is possible to detect that emission spectra, for example, by providing an optical sensor, which can be radially located, and in the line of sight of the plasma stream. It will be appreciated that even a healthy anode will typically discharge a small flux of material and therefore generate a small background spectra of atomic emission relating to the material of anode construction. A rise in intensity of the background spectra signal above a predetermined threshold level may be used as an indication of decreased anode health and to trigger warnings of, for example, impending maintenance requirements or remedial actions including reduction of plasma torch power to reduce anode erosion rate and lengthen plasma torch life.

Example components which can be monitored in a plasma abatement system may also include an abatement reaction chamber. A reaction chamber usually comprises: a cylindrical reactor also known as a reaction tube. The reactor can be made of stainless steel (SS), inert materials such as hastelloy (HA) and/or ceramic-based materials featuring alumina (AL).

If monitoring health status of the reactor, one or more action can be triggered in dependence upon a trend or value in emission intensity of atoms indicative of reactor wear, for example, iron (SS), nickel, molybdenum, chromium (HA) and/or aluminium (AL).

Figure 5:
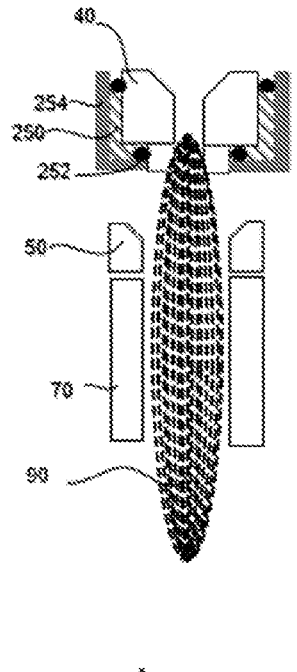
FIGS. 5a and 5b illustrate schematically an arrangement to monitor seal failure.
Figure 5:
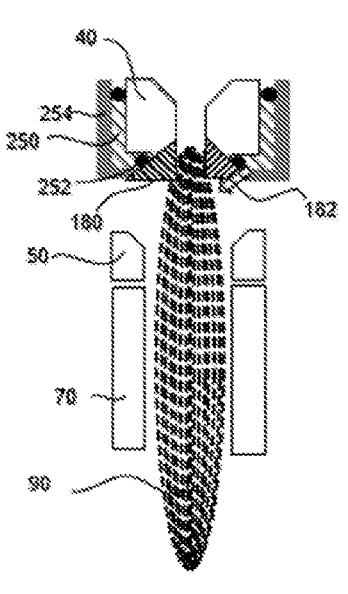

Further example components which can be monitored in a plasma abatement system may include the mixing cone 50, and system seals (one example shown in FIG. 5).

Whilst, as described above, it is possible to monitor for a trend or value in emission intensity of atoms indicative of component wear based solely upon a material from which various components are usually formed, some arrangements recognise that one or more components of the system may include a sacrificial layer or one or more sacrificial element formed from a material with a distinctive emission spectra. By including such a sacrificial component inserted, embedded or formed within a component of a plasma abatement device, it becomes possible to monitor emission spectra occurring within the abatement device and to recognise erosion of one or more device components when a distinctive emission spectrum associated with a sacrificial element is detected. In one possible example, different components of the system may have sacrificial components or elements included such that their erosion signature may differ from that of any other component. This may result from appropriate component material choice and/or appropriate sacrificial element choice in relation to each component to be monitored.

Methods and arrangements described may facilitate timely detection of component wear within a plasma abatement device. For example, methods and arrangements may provide a mechanism to detect excessive anode wear in a DC plasma torch and/or erosion of the reaction chamber and/or erosion or wear of a mixing cone and/or erosion or wear of the system seals Primary life-limiting failure modes for DC Plasma torch abatement systems include: component wear due to a combination of melting as a result of excessively localised arc attachment and erosion induced by plasma-induced physical sputtering or by chemical attack. Optical emission spectroscopy approaches can provide a mechanism to monitor the plasma and provide a qualitative and/or quantitative measurement of the concentration of metallic species in a plasma stream. The concentrations detected by optical emission spectroscopy may, for example, be directly correlated to wear of an anode, reaction chamber, mixing cone, seal or other component of the plasma abatement system.

Figure 2:
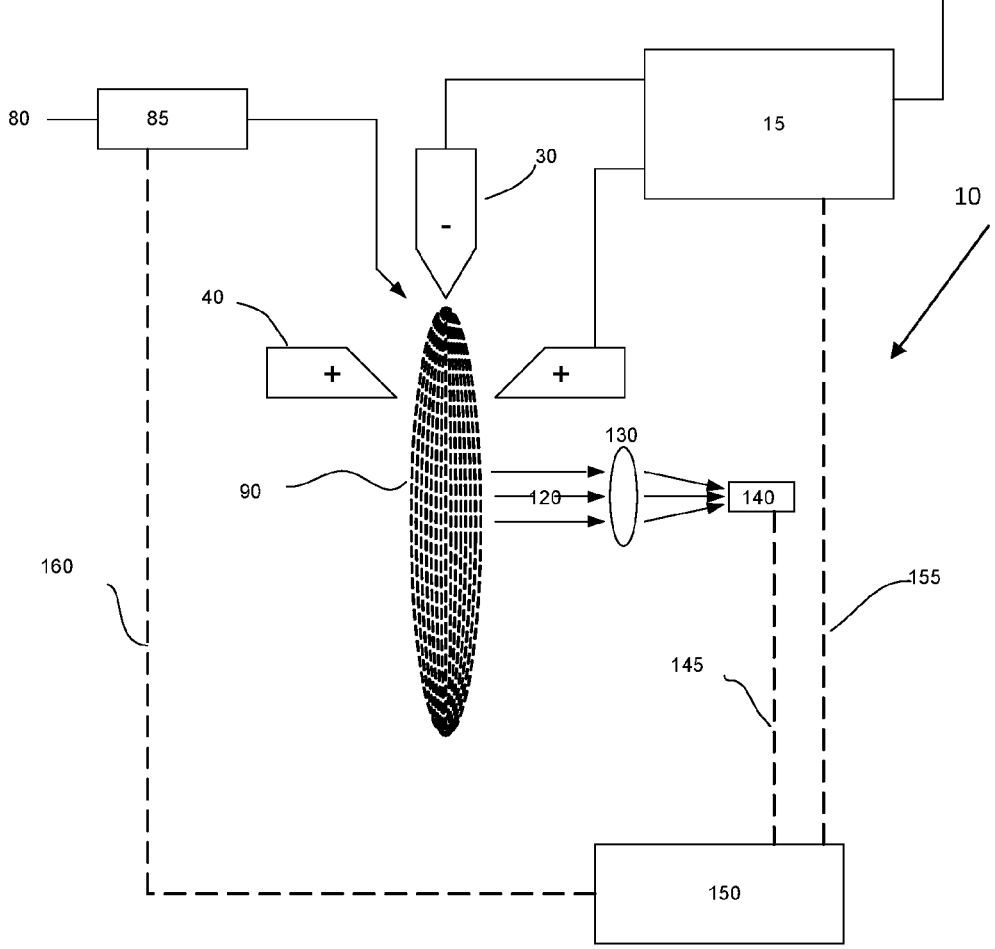
FIG. 2 illustrates schematically an arrangement to monitor anode erosion.

Various example implementations are now described in more detail:

FIG. 2 illustrates schematically an arrangement to monitor anode erosion. In the arrangement shown, plasma abatement apparatus 10 operates such that a power supply 15 applies a voltage potential V between a cathode 30 and an anode 40 at a substantial current I to sustain a plasma forming arc. A supply of plasma forming gas 80 passes between the cathode and anode. The gas supply is introduced at a regulated flow, for example, via a mass-flow controller 85. The plasma forming gas 80 is heated and ionised by the plasma forming arc to form a plasma stream 90.

According to the arrangement shown schematically in FIG. 2, optical emission 120 from the plasma stream 90 is collected by a lens 130 and focused on a suitable optical detector 140. A signal from the detector 140 is used by a control system 150.

Control system 150 is configured to use an algorithm to analyse a signal 145 from the detector 140. In the arrangement shown, operation of the plasma abatement apparatus 10 is adjustable in dependence upon the algorithm implemented by the control system and a detected relative concentration of one or more emitting species as determined from signal 145.

In the arrangement shown, the control system is configured to adjust operation of the plasma abatement apparatus by adjusting power supply voltage V via a control signal 155 sent to the power supply 15. That control signal may result in a change in discharge current I applied between anode and cathode. The control system may also, or alternatively, be configured to adjust the flow of plasma forming gas via a control signal 160 sent to the mass-flow controller 85. That control signal may result in a mass flow change, which in turn regulates voltage. For a DC arc torch the power supply unit typically delivers a constant current while voltage can be regulated by plasma gas flow. The plasma arc position and discharge voltage can be regulated by the plasma-forming gas flow. By adjusting the operating characteristics of the system, component life may be extended, allowing for continued operation of the abatement platform in support of a manufacturing process, until more a more appropriate time for disruptive maintenance associated with component replacement.

It will be appreciated that in the example illustrated in FIG. 2, optical emissions from the plasma stream are monitored upstream of an abatement chamber in which a process gas stream is mixed with the plasma stream. As a result, the optical emissions and associated observations can be largely independent of any material forming part of the abatement process.

Figure 3:
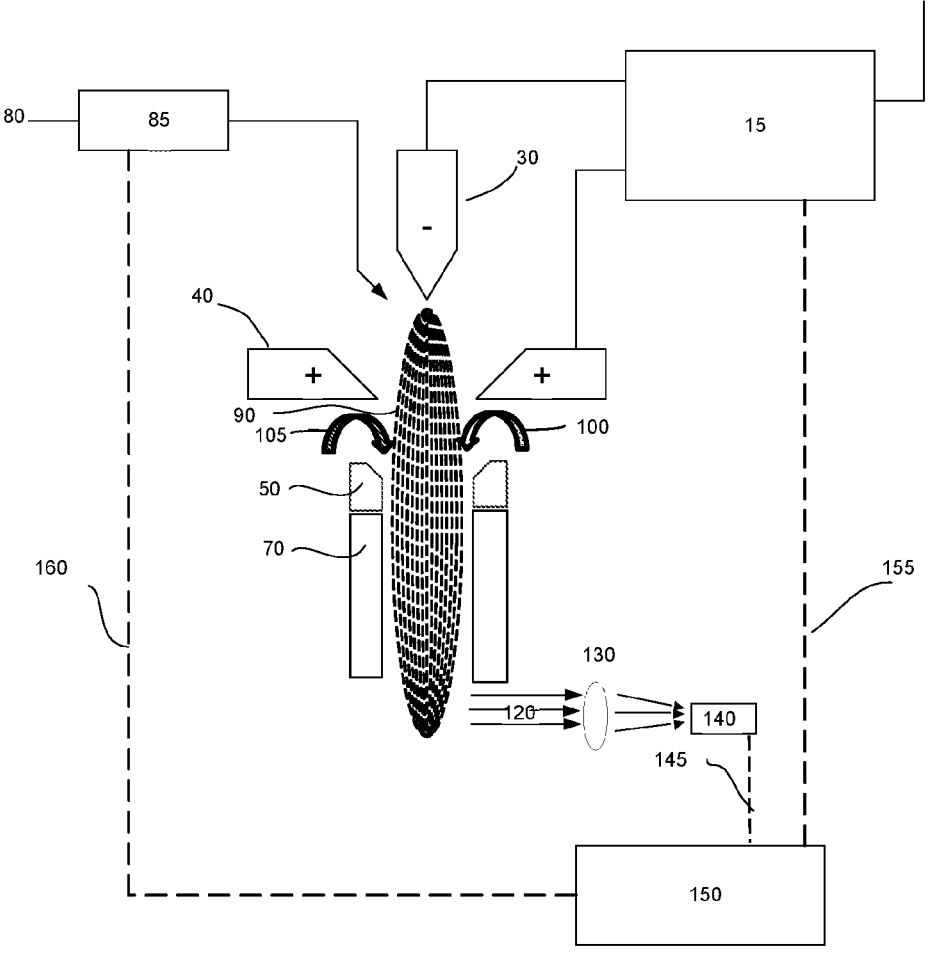
FIG. 3 illustrates schematically an arrangement to monitor reaction chamber erosion.

FIG. 3 illustrates schematically an arrangement to monitor component erosion, including, reaction chamber 70 erosion, mixing cone 50 erosion and/or seal erosion. A similar system to that shown in FIG. 2 is illustrated, in which a cylindrical reaction chamber 70 is included after the mixing cone 50. The reaction chamber 70 enhances the abatement efficiency by confining the effluent gas 100 and forcing it towards the hot plasma plume 90 and providing thermal insulation. An abatement reagent 105 (analogous to the fluid reagent 110 described in relation to FIG. 1) can be injected concurrently to the effluent gas. In the arrangement of FIG. 3, optical emission 120 from the plasma is collected by a lens 130 toward a detector 140 at a position close to an outlet of the reaction chamber 70. Emission spectra from this point in the process can be deconvoluted by an algorithm to monitor reaction chamber and/or mixing nozzle status. The emission spectra can be used, to detect for example, erosion of the mixing nozzle and/or an inner surface of the reaction chamber. The emission spectra can also be analysed to infer one or more trend which could lead to reaction chamber blockage.

In particular, in relation to erosion or wear detection, the collected emission spectra may be analysed to detect emission line(s) associated with wear of the mixing nozzle 50 or wear of the reaction chamber 70. That wear may be detected as a result of detection of emission line(s) associated with material from which the nozzle or reaction chamber is formed, or detection of emission line(s) associated with a sacrificial layer or element located in the mixing nozzle or reaction chamber, either of which can provide an indication of component wear. Detection of an emission line associated with wear of the nozzle or chamber may, for example, pass a preselected intensity threshold and/or show a preselected trend and trigger a maintenance warning or similar indication that the component or system require attention.

FIG. 4 illustrates example spectra and change in such spectra if component erosion is detected. FIG. 4 shows signature spectra associated with a plasma abatement system and an instance of an anomalous spectra which may be detected. The spectra may, for example, be associated with an arrangement such as that shown and described in relation to FIG. 2, in which an anode is formed from copper. It can be seen that the anomalous spectra includes a Cu spectral line, which may, for example, be associated with wear of an anode in a system. In particular, FIG. 4 illustrates examples of electronic emission spectra which can be used to identify anomalous erosion of a copper anode in a DC arc torch. In FIG. 4 normal emission spectra 200 associated with a plasma abatement device is shown adjacent to an anomalous emission spectra 210 in which a copper anode has begun to erode. In both the normal 200 and anomalous spectra 210, spectral lines related to atomic nitrogen 201, spectral lines related to atomic oxygen 202, spectral lines related to molecular nitrogen 203 and spectral lines related to copper 205, from which the anode is formed, can be seen. A threshold value 207 relating to emission intensity threshold for copper emission is shown. If copper spectral lines reach this level, then ameliorative or maintenance action can be taken, or a warning triggered.

FIGS. 5*a* and 5*b* illustrate schematically an arrangement to monitor seal failure. As shown in FIGS. 5*a* and 5*b*, a device may include a casing or housing which may protect one or more components from a surrounding environment, or which may facilitate cooling of one or more components forming the device. In FIGS. 5*a* and 5*b* an anode casing 254 is provided which allows anode 40 to be cooled by water 250. The region in which cooling water is provided is typically sealed by seals 252 to ensure that cooling circuit water may not enter the reaction chamber. If those seals are compromised it has been found that OH emission spectral lines (indicative of water content in the reaction chamber, resulting from a water leak 182) can be used as an indication of erosion of seal material. Typically, the cooling water circuit (not shown in detail) is provided to cool plasma torch electrodes, the reaction chamber and/or mixing cone. That cooling circuit is separated from the active processes occurring within the reaction chamber by one or more seals. If water 182 gets into the plasma plume, as may happen in the case of cooling circuit seal failure, the OH emission increases. It will therefore be appreciated that monitoring emission within the reaction chamber may allow for monitoring of the status of one or more seal configured to prevent ingress of contaminants into the abatement reaction chamber. Such seals may prevent, for example, ingress of cooling water into the effluent gas stream and plasma stream. Similar seals may prevent, for example, ingress of air from a surrounding or ambient environment into the reaction chamber and/or effluent gas stream and plasma stream.

TABLE 1

| Elements | Emission spectra; examples of intense peaks |
|---|---|
| Cu (I, II ionisation) | 306.3, 324.8, 327.4, 402.3, 406.3, 424.9, 427.5, 450.9, 454.0, 458.7, 465.1, 491.0, 491.8, 493.2, 495.4, 505.2, 515.3, 521.8, 522.0, 529.3 |
| Ag (I, II ionisation) | 328.1, 338.3, 421.1, 520.9, 540.0, 540.3, 546.5, 548.8, 555.2, 561.1, 562.2, 768.8, 827.4, 840.4 |
| Fe (I, II ionisation) | 300.3, 317.8, 321.1, 322.8, 344.1, 347.5, 349.1, 363.1, 368.3, 370.6, 372.3, 373.3, 374.6, 374.9, 382.4, 385.6, 387.9, 390.0, 392.3, 393.0, 404.6, 434.8, 526.0, 527.0 |
| Ca (I, II ionisation) | 315.9, 317.9, 318.1, 370.6, 373.7, 393.4, 396.8, 422.7, 445.5, 585.7, 616.2, 643.9, 645.0, 646.3, 649.4, 671.8, 820.2, 824.9, 849.8, 854.2, 866.2 |
| Al (I, II ionization) | 302.7, 304.1, 305.0, 305.7, 307.5, 308.2, 308.9, 309.3, 394.4, 396.2, 458.6, 466.3, 555.7, 559.3, 669.6, 669.9, 783.5, 783.6, 877.4, 884.1 |

Table 1 provides an indication of emission peaks associated with various elements which may be used to form components of a device, or which may be chosen for use as a sacrificial element for inclusion within one or more components of a device.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method comprising:
collecting electromagnetic radiation generated by a plasma torch in a plasma torch device wherein the collected electromagnetic radiation generated by the plasma torch comprises emission from volatilised water associated with failure of a seal of the plasma torch device;
analysing the collected electromagnetic radiation generated by the plasma torch;
comparing the analysed electromagnetic radiation generated to known electromagnetic radiation associated with one or more components of the plasma torch device; and
triggering one or more actions in the event that the analysed electromagnetic radiation differs from the known electromagnetic radiation associated with one or more components of the plasma torch device.

2. The method according to claim 1, wherein the collected electromagnetic radiation generated by the plasma torch further comprises: emission from volatilised material associated with one or more components of the plasma torch device.

3. The method according to claim 1, wherein the analysed electromagnetic radiation comprises: optical emission spectra obtained from the collected electromagnetic radiation generated by the plasma torch.

4. The method according to claim 1, wherein the known electromagnetic radiation associated with one or more components of the plasma torch device comprises: a characteristic intensity.

5. The method according to claim 4, wherein one or more actions is triggered in the event that the analysed emission intensity passes a threshold difference from the known characteristic intensity.

6. The method according to claim 4, wherein one or more actions is triggered in the event that the analysed emission intensity is compared across two or more collections of electromagnetic radiation separated in time and is determined to be changing from the known characteristic intensity at a predetermined rate.

7. The method according to claim 1, wherein the known electromagnetic radiation associated with one or more components of the plasma torch device comprises: emission characteristic of a material forming at least part of the one or more components.

8. The method according to claim 1, wherein the one or more components of the plasma torch device comprises one or more of: an anode; an abatement reaction chamber; a plasma torch mixing cone; a device seal.

9. The method according to claim 1, wherein the one or more actions comprise one or more of: a remedial action to extend operation time of the plasma torch device; a maintenance action to extend life of the one or more components of the plasma torch device; raising one or more alerts indicative that one or more components of the plasma torch device require attention; a change in plasma current applied between a plasma torch device anode and a cathode; adjustment of a flow of plasma forming gas through the plasma torch device; or, a warning signal indicative that a maintenance action is required in relation to the plasma torch device or component of the plasma torch device.

\* \* \* \* \*